(12) United States Patent
Overgaard et al.

(10) Patent No.: US 10,602,024 B2
(45) Date of Patent: Mar. 24, 2020

(54) METHOD FOR CREATING AND FILTERING COMBINED SETS OF LINES FROM SCANNER TO REDUCE IMAGE ARTEFACTS

(75) Inventors: Poul Overgaard, Hillerød (DK); Peter Nissen, Skævinge (DK)

(73) Assignee: Global Scanning Denmark A/S, Allerød (DK)

( * ) Notice: Subject to any disclaimer, the term of this patent is extended or adjusted under 35 U.S.C. 154(b) by 1813 days.

(21) Appl. No.: 14/124,658

(22) PCT Filed: Jun. 7, 2011

(86) PCT No.: PCT/EP2011/059386
§ 371 (c)(1),
(2), (4) Date: Mar. 17, 2014

(87) PCT Pub. No.: WO2012/167816
PCT Pub. Date: Dec. 13, 2012

(65) Prior Publication Data
US 2015/0172612 A1 Jun. 18, 2015

(51) Int. Cl.
*H04N 1/48* (2006.01)
*H04N 1/58* (2006.01)
*H04N 1/60* (2006.01)
*H04N 1/193* (2006.01)
*H04N 1/56* (2006.01)

(52) U.S. Cl.
CPC .......... *H04N 1/486* (2013.01); *H04N 1/1932* (2013.01); *H04N 1/1934* (2013.01); *H04N 1/482* (2013.01); *H04N 1/56* (2013.01); *H04N 1/58* (2013.01); *H04N 1/6077* (2013.01)

(58) Field of Classification Search
None
See application file for complete search history.

(56) References Cited

U.S. PATENT DOCUMENTS

| 4,774,565 A | 9/1988 | Freeman |
| 2003/0160150 A1 | 8/2003 | Sheng |
| 2007/0035636 A1 | 2/2007 | Wu |

FOREIGN PATENT DOCUMENTS

| EP | 0211320 A2 | 2/1987 |
| WO | 2002/085034 A1 | 10/2002 |

OTHER PUBLICATIONS

International Search Report received for PCT Patent Application No. PCT/EP2011/059386, dated Feb. 13, 2012, 4 pages.
(Continued)

*Primary Examiner* — Scott A Rogers
(74) *Attorney, Agent, or Firm* — Morrison & Foerster LLP

(57) ABSTRACT

Disclosed is a method of processing data from an image scanner for reducing image artefacts. The image scanner comprises a first image sensor arranged to: record a first set of lines, the first set of lines comprising a plurality of pixels representing recorded intensities of a first colour, record a second set of lines, the second set of lines comprising a plurality of pixels representing recorded intensities of a second colour; and record a third set of lines, the third set of lines comprising a plurality of pixels representing recorded intensities of a third colour. The method comprises the steps of: processing at least two of the first, the second or the third set of lines to create a first combined set of lines and filtering said first combined set of lines to filter out image artefacts creating a first filtered combined set of lines.

25 Claims, 9 Drawing Sheets

(56) References Cited

OTHER PUBLICATIONS

International Preliminary Report on Patentability received for PCT Patent Application No. PCT/EP2011/059386, dated Aug. 21, 2013, 11 pages.
"Genealogy's Star: Can I Use a Digital Camera Instead of a Scanner for Genealogy?", Available at: <URL: http://genealogysstarblogspot.nl/2009/03/can-i-use-digital-camera-instead-of.html>, Mar. 22, 2009, pp. 1-7.
"Image Scanner—Wikipedia, the Free Encyclopedia", Available at: <URL:https://web.archive.org/web/20110521000152/http://en.wikipedia.org/wiki/Image_scanner>, 2011, pp. 1-8.
Office Action received for European Patent Application No. 11725053.0, dated Dec. 16, 2016, 11 pages.
International Written Opinion received for PCT Patent Application No. PCT/EP2011/059386, dated Feb. 13, 2012, 8 pages.

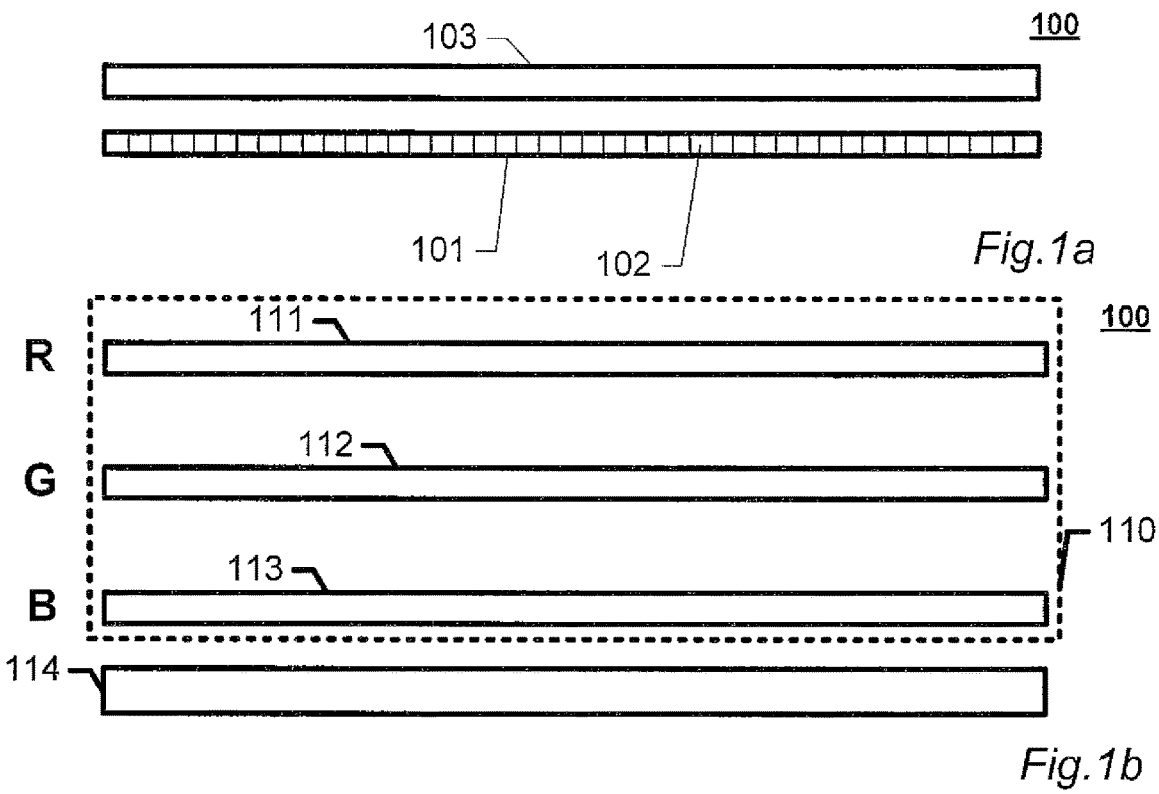
*Fig.1a*
*Fig.1b*
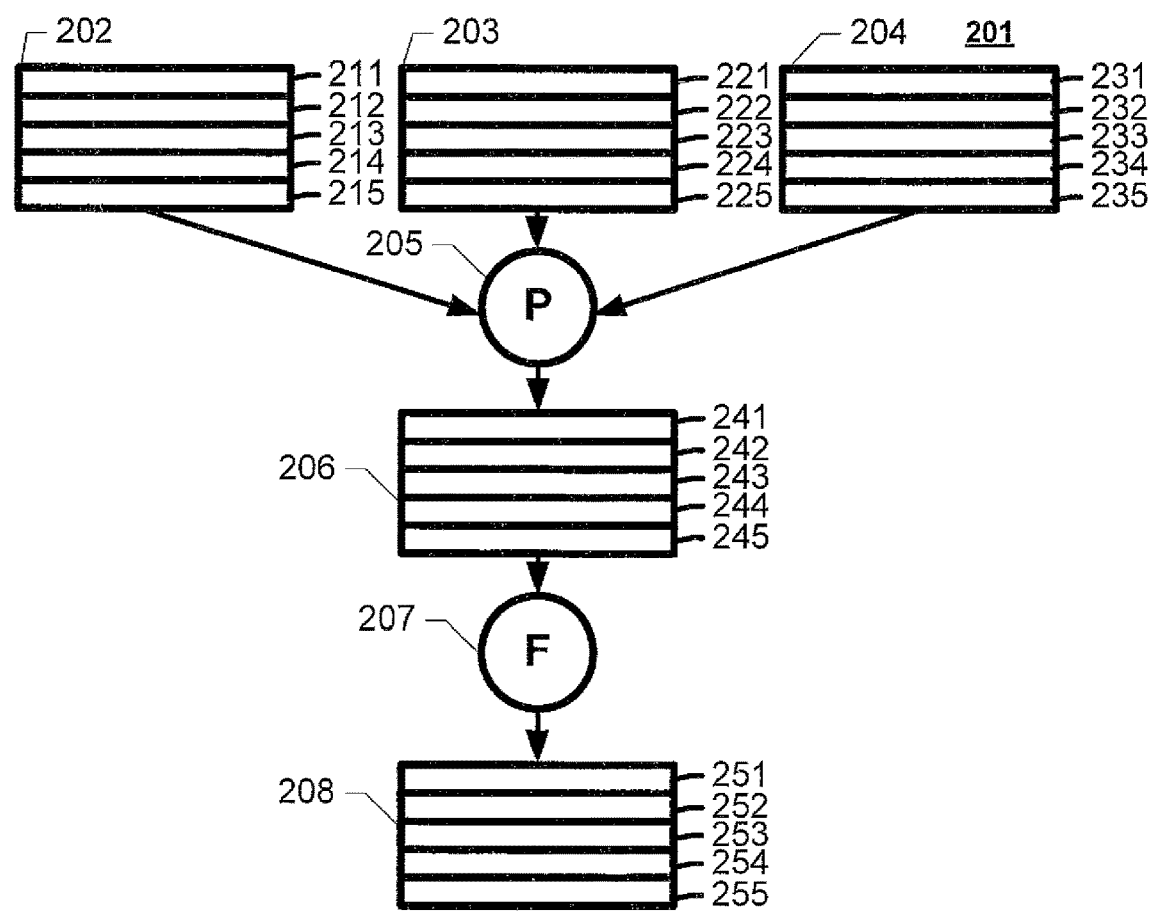
*Fig.2*

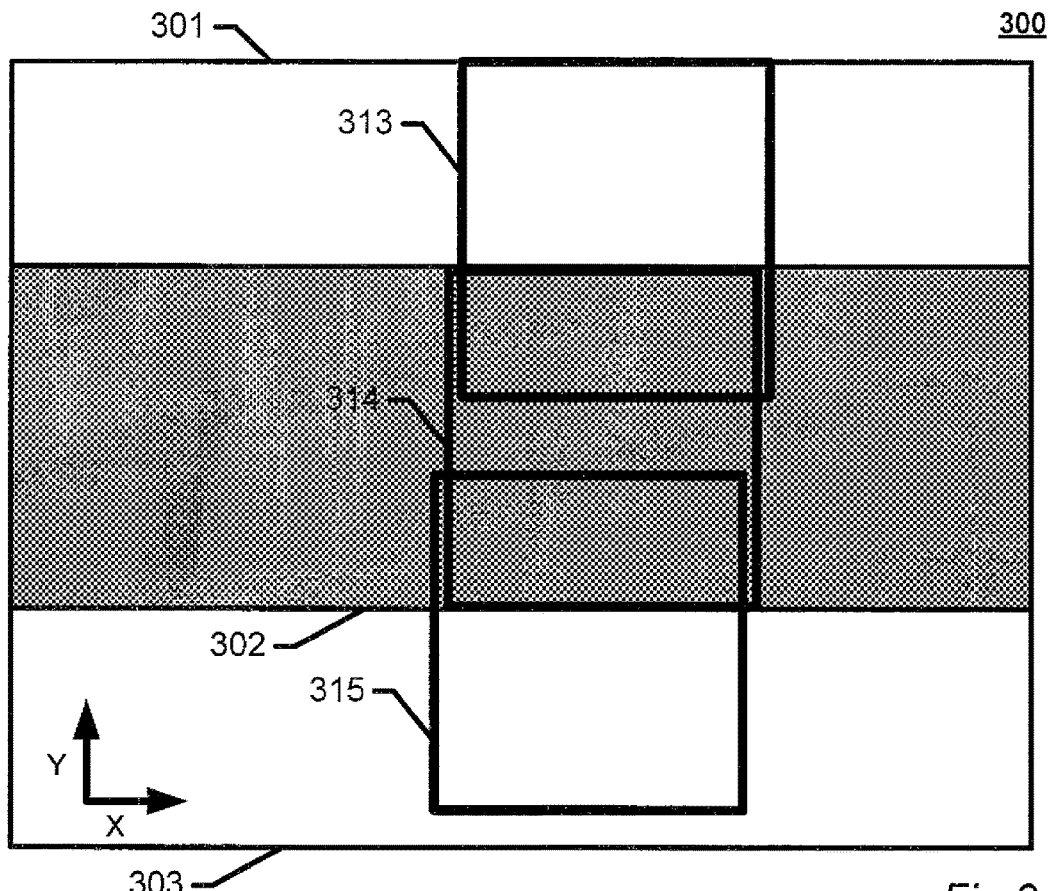
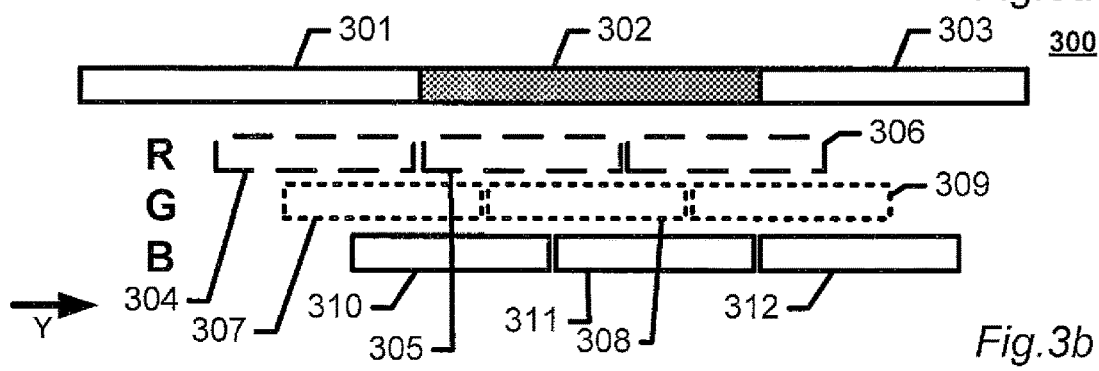
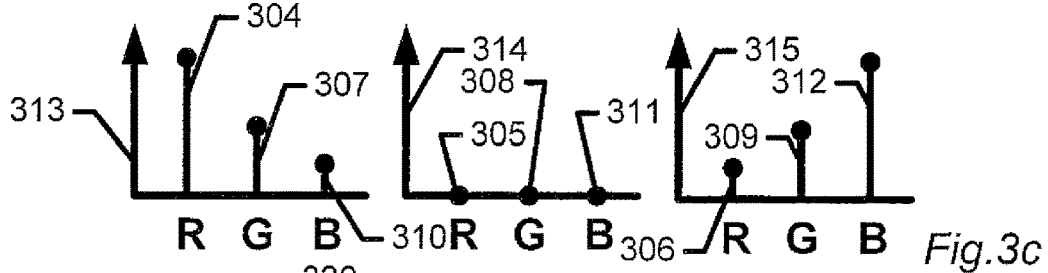
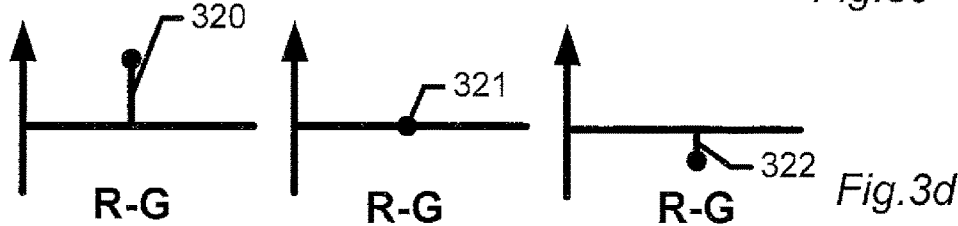
Fig.3a
Fig.3b
Fig.3c
Fig.3d

METHOD FOR CREATING AND FILTERING COMBINED SETS OF LINES FROM SCANNER TO REDUCE IMAGE ARTEFACTS

CROSS REFERENCE TO RELATED APPLICATIONS

This is a U.S. National Phase patent application of PCT/EP2011/059386, filed on Jun. 7, 2011, which is hereby incorporated by reference in the present disclosure in its entirety.

FIELD

This invention generally relates to optical colour scanning of a physical object. More particularly the invention relates to methods for removing image artefacts such as colour fringing, from scanned images and to optical scanners utilizing such methods.

BACKGROUND

Traditionally optical colour scanning of physical objects is performed by recording three or more colour intensities using an image sensor e.g. a red colour intensity, a green colour intensity and blue colour intensity, for a plurality of lines of the physical object. By combining the three or more recorded colours, lines comprising full colour pixel may be formed. Typically image sensors such as charged coupled device (CCD) or contact image sensors (CIS) are used.

As a result of the optical systems used in commercially available image scanners, only a single colour of a single point on the physical object may be recorded at a time. Thus a full colour line comprises image data recorded at different points in time, that may be spatially misaligned. This may create colour artefacts as a result of misalignment errors. This is especially a problem when scanning an object comprising high frequency information. A common resulting artefact is the introduction of strong colours in a scanned image, not present on the original physical object, this artefact may be known as colour fringing.

US2010309533A discloses a method and apparatus for scanning documents using a contact image scanner. The imaging apparatus comprises a light source for illuminating the document, a plurality of pixel sensors for generating a signal in response to light incident thereon, a lens for focusing light from the light source reflected from the document onto the plurality of pixel sensors, a colour matrix filter disposed between the pixel sensors and the light reflected from the document, and a circuit for processing the signal from the plurality of pixel sensors to generate the digital image of the document. The method comprises the steps of providing a plurality of pixel sensors for generating a signal in response to light incident thereon, projecting light from a light source onto the document in a sequential fashion along the length dimension thereof, reflecting the light projected onto the document onto the plurality of pixel sensors, filtering the light from the light source with a colour matrix filter, and processing the signal from the plurality of pixel sensors to generate the digital image of the document.

The method disclosed in US2010309533A may remove some artefacts however a new type of artefacts is introduced in the individual lines, due to the measurement setup. The introduction of a colour matrix filter will additionally increase the complexity and the cost of an image scanner made in accordance with the principles disclosed in US2010309533A Thus, it remains a problem to improve the image quality of colour scans in a simple and reliable manner.

Additionally it remains a problem to provide a method and/or scanner for reducing image sensor dependent artefacts when scanning large format documents using a plurality of image sensors.

SUMMARY

According to a first aspect, there is provided a method of processing data from an image scanner for reducing image artefacts, wherein said image scanner comprises a first image sensor arranged to:
  record a first set of lines from a first part of a physical object, the first set of lines comprising a plurality of pixels representing recorded intensities of a first colour;
  record a second set of lines from the first part of the physical object, the second set of lines comprising a plurality of pixels representing recorded intensities of a second colour; and
  record a third set of lines from the first part of the physical object, the third set of lines comprising a plurality of pixels representing recorded intensities of a third colour, wherein the method comprises the steps of:
  processing at least two of the first set of lines, the second set of lines or the third set of lines to create a first combined set of lines comprising a plurality of pixels each pixel having a value that is determined on the basis of at least two of the first set of lines, the second set of lines or the third set of lines; and
  filtering said first combined set of lines to filter out image artefacts creating a first filtered combined set of lines.

Consequently by processing data from recordings of at least two different colours, a combined set of lines may be formed where image artefacts are more pronounced. By filtering the combined set of lines, artefacts may effectively be filtered out resulting in scanned images with reduced image artefacts.

The image sensor may comprise image sensor elements arranged in an array or a plurality of arrays, e.g. a linear array or plurality of linear arrays. The image sensor may comprise two staggered linear arrays of image sensor elements, e.g. two 600 dpi arrays staggered to create a 1200 dpi image sensor. Any kind of image sensors suitable for optical scanning may be used, such as any kind of photo voltaic sensor e.g. a contact image sensor (CIS) or a charge coupled device (CCD) camera. A suitable lighting device may be arranged together with the image sensors such as a xenon-based lighting device, a cold cathode fluorescent lamp or an LED lighting device. The image sensors may comprise a plurality of different image sensor elements configured to detect light having different wave lengths; e.g. a first image sensor element may be configured to detect red light, a second image sensor element may be configured to detect green light, and a third image sensor element may be configured to detect blue light. The image sensor may comprise a plurality of arrays e.g. linear arrays, where a first array comprise a plurality of image sensor elements configured to detect light having a first range of wavelengths e.g. red light, a second array comprising a plurality of image sensor elements configured to detect light having a second range of wavelengths e.g. green light, and a third array having a plurality of image sensor elements configured to detect light having a third range of wavelengths e.g. blue light. Alternatively or additionally, the lighting devices may be configured to illuminate the physical object to be scanned with light having different wave lengths, e.g. the lighting devices may be configured to create red, green, and blue light.

In some embodiments, the image sensor is a contact image sensor (CIS).

In some embodiments, the image sensor is a charge-coupled device (CCD).

The image sensors may be arranged on a movable structure, and/or a physical object to be scanned may be moved past the image sensors so that a completely scanned image of the physical object may be formed.

The image artefacts that are reduced may be colour artefacts e.g. colour fringing The first set of lines, the second set of lines or third set of lines may comprise any number of lines such as at least 2, 3, 4, 5, 10, 20, 50 or more lines. The first set of lines, the second set of lines, or third set of lines may comprise the same number of lines or different number of lines. A line may comprise a plurality of pixels recorded at a plurality of positions positioned approximately on a line on the physical object. The first set of lines, the second set of lines or third set of lines may be stored in a memory in independent data structures e.g. the first set of lines may be stored in a first data structure, the second set of lines may be stored in a second data structure, and the third set of lines may be stored in a third data structure. Alternatively, some or all of the first set of lines, the second set lines, or the third set of lines may be stored in a common data structure. The first set of lines, the second set lines, or the third set of lines may be recorded from a part of the first part of the physical object. The physical locations on the physical object where the first set of lines, the second set of lines and the third set of lines are recorded may differ between the first set of lines, the second set of lines, and the thirds set of lines e.g. the first set of lines may be recorded from physical location on the physical object that at least partially differ from the physical locations where the second set of lines are recorded. The first colour, the second colour, and the third colour may be visible colours e.g. red, green, and blue. The first colour, the second colour, and the third colour may all be different e.g. the first colour may be different from the second and the third colour, and the second colour may be different from the third colour. Additional sets of lines may be recorded comprising pixels representing recorded intensities of additional colours e.g. a fourth colour and/or a fifth colour.

The physical object may be any object suitable for scanning such as a document, a book, a map or an image.

In some embodiments, the physical object comprises no more than on page. In some embodiments, the physical object comprises a plurality of pages.

The first combined set of lines may be created using any algorithm taking at least data from two of the first set of lines, the second set of lines or, the third set of lines as an input. The algorithm may read data from at least two independent data structures e.g. the algorithm may read data from a first independent data structure where the data of the first set of lines are stored and a second independent data structure where the data of the second set of lines or third set of lines are stored. Alternatively, or additionally the algorithm may read data from a combined data structure comprising data from at least two of the first set of lines, the second set of lines, or the third set of lines. The algorithm may comprise at least one subtraction or division between data from the first set of lines, the second set of lines and/or the third set of lines.

The combined set of lines may comprise any number of lines such as at least 2, 3, 4, 5, 10, 20, 50 or more lines. The combined set of lines may comprise the same number of lines as the first set of lines, the second set of lines, or the third set of lines, or the combined set of lines may comprise a different number of lines.

In some embodiment, the step of creating a first combined set of lines and the step of filtering the first combined set of lines may be combined in a single step such that values of the first combined set of lines are calculated at the point in time when they are needed by the filtering process.

Consequently, memory resources may be lowered as the values of the combined set of lines are calculated on demand and therefore does not need to be stored.

In some embodiments, the spatial locations on the physical object where the first set of lines are recorded at least partly overlap with the spatial location on the physical object where the second set of lines are recorded.

In some embodiments, the spatial location on the physical object where the second set of lines are recorded at least partly overlap with the spatial location on the physical object where the third set of lines are recorded.

In some embodiments, the spatial location on the physical object where the first set of lines are recorded at least partly overlap with the spatial location on the physical object where the third set of lines are recorded.

In some embodiments, a value of a particular pixel in the first combined set of lines is determined by processing a value obtained from a particular pixel in each of two selected set of lines of the first set of lines, the second set of lines or the third set of lines e.g. a value of a particular pixel in the first combined set of lines may be determined by processing a value obtained from a particular pixel in the first set of lines together with a value obtained from a particular pixel in the second set of lines.

The value of the particular pixel in the first combined set of lines may be determined using an algorithm taking a value from a particular pixel in at least two of the first set of lines, the second set of lines and the third set of lines as an input e.g. the algorithm reads at least two input values, at least one input value from the particular pixel in e.g. the first set of lines and one input value from a particular pixel in e.g. the second set of lines. In some embodiments, the algorithm may comprise at least one subtraction between the two input values or at least one division between the two input values.

In some embodiments, the two values of a particular pixel in the two selected set of lines is processed to create the value of the particular pixel in the first combined set of lines so that the value of the particular pixel in the first combined set of lines is dependent on the difference between the values of the particular pixel in the selected two set of lines.

Consequently, a combined set of lines may be created that represents the difference between the select two set of lines.

In some embodiments, the two values of a particular pixel in the two selected set of lines is processed to create the value of the particular pixel in the first combined set of lines so that an increase in the difference between the values of the particular pixel in the select two set of lines always will result in an increase in the absolute value of the particular pixel in the first combined set of lines.

Thereby, the combined set of lines may comprise values that can be directly linked to the difference between the values in the selected two set of lines, for instance if the difference between the values in the first set of lines and the values in the second set of lines is high the values of the combined set of lines may correspondingly be high.

In some embodiments, the first set of lines, the second set of lines and the third set of lines are merged into a colour set of lines comprising a plurality of pixels, wherein each pixel in the colour set of lines comprises three colour values specifying recorded colour intensity values and wherein the step of creating a combined set of lines comprises for each pixel in the colour set of lines processing at least two of the three colour values together to form a pixel value in the combined set of lines, so that each pixel in the combined set of lines is determined on the basis of at least two colour values of a pixel of the colour set of lines.

Consequently, the method may be used with image data recorded and stored in full colour image data structures.

In some embodiments, the step of filtering said first combined set of lines further comprises processing pixels of said first combined set of lines created from data recorded at different points in time.

Consequently, artefacts resulting from misalignment of the different sets of lines may be filtered out.

In some embodiments, the step of processing said first combined set of lines to filter out artefacts comprises filtering out high frequency content of the first combined set of lines.

The filter may have any filter kernel size. In some embodiments, the kernel is larger in a first dimension than in a second dimension. The filter may be a linear filter e.g. a low-pass filter or a nonlinear filter e.g. a median filter.

The filter kernel may have a shape so that pixels from at least 2, 3, 4, 5, 6, 8 or 10 lines are processed together to yield an output value of the filtering process. The filter kernel may have a shape so that no more than 1, 2, 3, 4 or 5 pixels from each line are processed together to yield an output value of the filtering process.

In some embodiments, the step of processing said first combined set of lines comprises median filtering the first combined set of lines.

In some embodiment, the filter kernel may comprise periodically positioned holes e.g. the filter kernel may comprise holes so that only pixels from every other line, every third line, every fourth line or every fifth line are processed together to yield an output value of the filtering process.

In some embodiments, the method additionally comprises the step of:
  processing at least two of the first set of lines, the second set of lines or the third set of lines to create a second combined set of lines comprising a plurality of pixels each pixel having a value that is determined on the basis of at least two of the first set of lines, the second set of lines or the third set of lines; and
  filtering said second combined set of lines to filter out image artefacts creating a second filtered combined set of lines.

Consequently, by creating two combined set of lines and filtering each of them, even more image artefacts may be removed.

Any methods discussed above or below in relation to creating the first combined set of lines may equally be applied when creating the second combined set of lines. Correspondingly any method discussed above or below in relation to filtering the first combined set of lines may equally be applied when filtering the second combined set of lines.

In some embodiment, the first combined set of lines and said second combined set of lines are processed independently so that the first filtered combined set of lines is not directly influenced by the second combined set of lines, and the second filtered combined set of lines is not directly influenced by the first filtered combined set of lines.

In some embodiments, the first combined set of lines is created by processing at least the first set of lines and the second set of lines, and the second combined set of lines is created by processing at least the second and the thirds set of lines.

In some embodiments, the first combined set of lines represents the colour balance between the first colour and the second colour in the first part of the physical object.

The colour balance between the first colour and the second colour may be defined as the difference in intensity between the first colour and the second colour.

In some embodiments, the second combined set of lines represents the colour balance between the second colour and the third colour in the first part of the physical object.

The colour balance between the second colour and the third colour may be defined as the difference in intensity between the second colour and the third colour.

In some embodiments, each of the first set of lines, the second set of lines, and the third set of lines are processed to create the first combined set of lines, wherein the first combined set of lines comprises a plurality of pixels, each pixel having a value that is determined on the basis of the first set of lines, the second set of lines and the third set of lines.

In some embodiments, the method further comprises processing at least two of the first set of lines, the second set of lines or the third set of lines to create a third combined set of lines comprising a plurality of pixels each pixel having a value that is determined on the basis of at least two of the first set of lines, the second set of lines or the third set of lines.

Consequently, by creating three combined set of lines all the information of the first set of lines, the second set of lines and the third set of lines may be coded in a different format. The third combined set of lines may additionally assist in converting the data stored in the first combined set of lines and the second combined set of lines into data directly specifying recorded colour intensities of the first colour, the second colour and the third colour.

In some embodiments, the first combined set of lines, the second combined set of lines and the third combined set of lines are created such that all information present in the first set of lines, the second set of lines, and third set of lines also is present in the first combined set of lines, the second combined set of lines and the third combined set of lines.

In some embodiments, the first filtered combined set of lines is processed together with specific additional data to generate a first filtered set of lines comprising a plurality of pixels each pixel having a value that represents an intensity of the first colour.

In some embodiments, the first filtered combined set of lines is processed together with specific additional data to generate a second filtered set of lines comprising a plurality of pixels each pixel having a value that represents an intensity of the second colour.

In some embodiments, the first filtered combined set of lines and the second filtered combined set of lines is processed together with specific additional data to generate a first filtered set of lines comprising a plurality of pixels each pixel having a value that represents an intensity of the first colour, a second filtered set of lines comprising a plurality of pixels each pixel having a value that represents an intensity of the second colour, and a third filtered set of lines comprising a plurality of pixels each pixel having a value that represents an intensity of the third colour.

In some embodiments, the second filtered combined set of lines is processed together with specific additional data to generate a second filtered set of lines comprising a plurality of pixels each pixel having a value that represents an intensity of the second colour.

Examples of specific additional data are one or more of, the first set of lines, the second set of lines, the third set of lines, the first combined set of lines, the second combined set of lines, the third combined set of lines, the first filtered combined set of lines, the second filtered combined set of lines, the third filtered combined set of lines, the first filtered set of lines, the second filtered set of lines and/or the third filtered set of lines.

For some applications it may be beneficial to lower the computational requirements of the method.

In some embodiments, the first combined set of lines is created by processing the first set of lines and the third set of lines, the second combined set of lines is created by processing the second set of lines and the third set of lines, and wherein the first filtered combined set of lines is processed together with the third set of lines to generate a first filtered set of lines, the first filtered set of lines comprising a plurality of pixels each pixel having a value that represents an intensity of the first colour, and the second filtered combined set of lines is processed together with the third set of lines to generate a second filtered set of lines, the second filtered set of lines comprising a plurality of pixels each pixel having a value that represents an intensity of the second colour.

In some embodiments, the first filtered set of lines, the second filtered set of lines and the third set of lines are processed to generate a filtered colour set of lines comprising a plurality of pixels, wherein each pixel in the filtered colour set of lines comprises three colour values one obtained from the first filtered set of lines, one obtained from the second filtered set of lines, and one obtained from the third set of lines.

Consequently by creating a filtered colour set of lines comprising an unfiltered component, fewer computations are needed. This may additionally lower the memory requirements of the method.

Scanning of large objects, e.g. large maps or technical drawings, is conventionally performed by using a plurality of image sensors as it is a difficult and expensive task to manufacture large single image sensors. Each image sensor creates a unique set of artefacts due to a large number of factors, such as the individual sensitivity of the image sensors and the recording setup. This may create patterns in the final images making it visible that a plurality of different image sensors has been used. Thus it remains a problem to provide a method for creating more homogenous images, making the boundaries of the individual image sensors less visible.

In some embodiments, the image scanner further comprises a second image sensor arranged to:
  record a fourth set of lines from a second part of the physical object, the fourth set of lines comprising a plurality of pixels representing recorded intensities of the first colour;
  record a fifth set of lines from the second part of the physical object, the fifth set of lines comprising a plurality of pixels representing recorded intensities of the second colour; and
  record a sixth set of lines from the second part of the physical object, the sixth set of lines comprising a plurality of pixels representing recorded intensities of the third colour, wherein the method comprises the steps of:
    processing at least two of the fourth set of lines, the fifth set of lines or the sixth set of lines to create a fourth combined set of lines comprising a plurality of pixels each pixel having a value that is determined on the basis of at least two of the fourth set of lines, the fifth set of lines or the sixth set of lines; and
    filtering said fourth combined set of lines to filter out image artefacts creating a fourth filtered combined set of lines.

Consequently, a method is provided that removes some of the unique artefacts created by the different image sensors, thus making the boundaries in the resulting image less visible.

The second part of the physical object may comprise at least a part that is different from the first part of the physical object. The first part and the second part may comprise a common part e.g. a part of physical object may be recorded by both the first image sensor and the second image sensor.

Embodiments described in connection with the first image sensor herein may equally be applied to the second image sensor e.g. the data recorded from the second image sensor may processed in the same way as the data recorded from the first image sensor e.g. the fourth combined set of lines may be created by processing the fourth set of lines, the fifth set of lines and the sixth set of lines in the same way as the first set of lines, the second set of lines and the third set of lines are processed to create the first combined set of lines.

According to a second aspect, there is provided an apparatus for scanning comprising a first image sensor arranged to:
  record a first set of lines from a first part of a physical object, the first set of data comprising a plurality of pixels representing recorded intensities of a first colour;
  record a second set of lines from the first part of the physical object, the second set of lines comprising a plurality of pixels representing recorded intensities of a second colour; and
  record a third set of lines from the first part of the physical object, the third set of lines comprising a plurality of pixels representing recorded intensities of a third colour, wherein the apparatus further comprises a processing unit configured to:
  processing at least two of the first set of lines, the second set of lines or the third set of lines to create a first combined set of lines comprising a plurality of pixels each pixel having a value that is determined on the basis of at least two of the first set of lines, the second set of lines or the third set of lines; and
  filtering said first combined set of lines to filter out image artefacts creating a first filtered combined set of lines.

Here and in the following, the terms 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof The different aspects of the present invention can be implemented in different ways including the methods of processing data and the apparatuses described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein:

FIG. 1a-b show image sensors according to some embodiments of the present invention.

FIG. 2 shows a schematic drawing of a method of processing data from an image sensor for removing image artefacts according to an embodiment of the present invention.

FIGS. 3a-c illustrate how image artefacts may result from the recording setup used in commercially available scanners.

FIG. 3d show three pixel values from a combined set of lines created according to an embodiment of present invention.

DETAILED DESCRIPTION

Figure 4A:
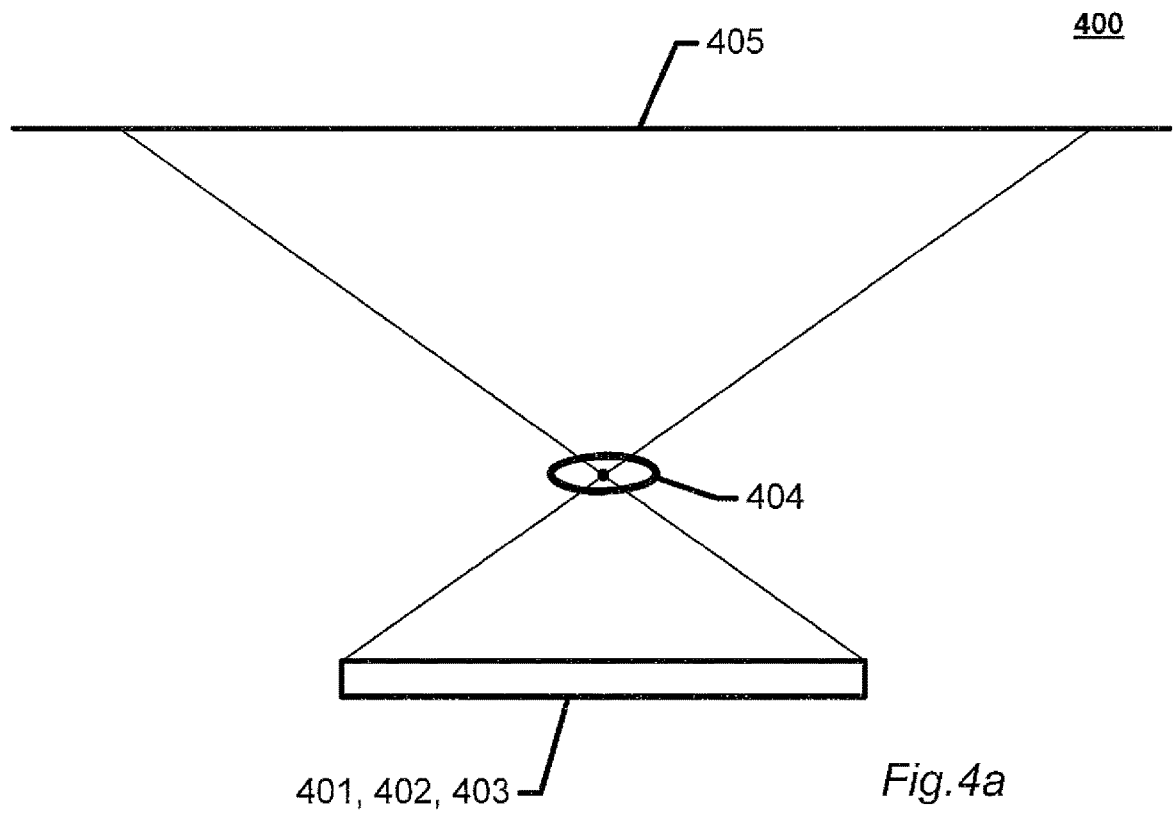
FIGS. 4a-b show an image sensor according to embodiments of the present invention.

In the following description, reference is made to the accompanying figures, which show, by way of illustration, how the invention may be practiced.

FIG. 1a shows a schematic drawing of an image sensor 101 and a light source 103 according to an embodiment of the present invention. The image sensor 101 comprises a plurality of image sensor elements 102 arranged in a linear array. The light source 103 is associated with the first image sensor 101 by being arranged so that light is emitted from the light source 103 towards a physical object to be scanned and reflected by the physical object towards the image sensor 101. This allows the image sensor 101 to generate an image of the physical object. By mechanically moving the image sensor 101 over a physical object to be scanned and/or pulling the physical object over the image sensor 101 a complete image may be formed.

The light source 103 may be configured to generate light with different colours e.g. red, green, and blue. By sequentially changing the colour of the light generated by the light source 103 while the image sensor moves relative to the physical object to be scanned, different sets of lines may be recorded representing colour intensities of different colours. By combining the different sets of lines a scanned full colour image of the physical object may be generated.

FIG. 1b shows a schematic drawing of an image sensor 110 and a light source 114 according to an embodiment of the present invention. The image sensor 110 comprises three linear arrays 111 112 113 of image sensor elements spatially displaced relative to each other. The first linear array 111 comprises image sensor elements configured to detect light having a first colour e.g. red light. This may be achieved by using specific image sensor elements sensitive to the first colour and/or using filters positioned in front of the image sensor elements. The second linear array 112 comprises image sensor elements configured to detect light having a second colour e.g. green light. This may be achieved by using specific image sensor elements sensitive to the second colour and/or using filters positioned in front of the image sensor elements. The third linear array 113 comprises image sensor elements configured to detect light having a third colour e.g. blue light. This may be achieved by using specific image sensor elements sensitive to the third colour and/or using filters positioned in front of the image sensor elements. The light source 114 is configured to emit approximately white light towards a physical object to be scanned. By using the linear arrays 111 112 113 of the image sensor 110 to record the reflected light from the physical object, three lines may be formed representing colour intensities of three different colours. By mechanically moving the image sensor 110 over a physical object to be scanned and/or pulling the physical object over the image sensor 110 three sets of lines may be formed representing recorded colour intensities of three different colours of the physical object. By combining and rearranging the three sets of lines to counteract the displacement of the image sensors, a full colour image of the physical object may be formed.

FIG. 2 shows a schematic drawing of a method of processing data from an image sensor for removing image artefacts according to an embodiment of the present invention. Shown is a first set of lines 202, a second set of lines 203, and a third set of lines 204. The first set of lines 202 comprises a plurality of lines 211 212 213 214 215 each comprising a plurality of pixels representing recorded intensities of a first colour. The second set of lines 203 comprises a plurality of lines 221 222 223 224 225 each comprising a plurality of pixels representing recorded intensities of a second colour. The third set of lines 204 comprises a plurality of lines 231 232 233 234 235 each comprising a plurality of pixels representing recorded intensities of a third colour.

The plurality of lines in the first set of lines, the second set of lines and the third set of lines may be recorded with image sensors as shown in FIG. 1a-b e.g. each pixel may be recorded by an image sensor element.

If the image sensor as shown in FIG. 1a is used to record the first set of lines, the second set of lines and the third set of lines, the individual lines may have been recorded in the following order: 211, 221, 231, 212, 222, 232, 213, 223, 233, 214, 224, 234, 215, 225, and 235.

If the image sensor as shown in FIG. 1b is used to record the first set of lines, the second set of lines and the third set of lines, the individual lines may have been recorded in the following order: 211, 222 and 233 simultaneously, then 212 223 234 simultaneously, and so forth.

By processing 205 at least two of the first set of lines, the second set of lines or the third set of lines 202 203 204 a first combined set of lines 206 is created comprising a plurality of pixels having a value that is determined on the basis of at least two of the first set of lines, the second set of lines or the third set of lines. By filtering 207 the first combined set of lines 206 a first filtered combined set of lines 208 is created.

The information from the at least two sets of lines may be processed so that the combined set of lines 206 comprises information describing the relative distribution between the first colour, the second colour, and the third colour in the pixels. As some image artefacts e.g. the image artefacts described in relation to FIG. 3*a-d*, result in large changes in the relative distribution between the different colours, a filter 207 that works on the combined set of lines 206 may be more effective. The filtered combined set of lines 208 may optionally be transformed back into one or more filtered set of lines having pixels representing intensities of the first colour, the second colour, or the third colour.

FIGS. 3*a-c* illustrates how image artefacts may result from the recording setup used in commercially available scanners. FIG. 3*a* shows a top view of a physical object 300 comprising two white parts 301 303 and a black part 302. Shown is also three boxes showing the area from where three full colour pixels 313 314 315 are recorded. The three boxes have been moved slightly in a horizontal direction from their true position to make the drawing more intelligible.

FIG. 3*b* shows a side view of the physical object 300 shown in FIG. 3*a* and the y position of the area from where three pixels 304 305 306 from three lines of a first set of lines are recorded, the y position of the area from where three pixels 307 308 309 from three lines of a second set of lines are recorded, and the y position of the area from where three pixels 310 311 312 from three lines of a third set of lines are recorded. The first set of lines comprises pixels representing recorded intensities of a first colour e.g. red, the second set of lines comprises pixels representing recorded intensities of a second colour e.g. green and the third set of line comprises pixels representing recorded intensities of a third colour e.g. blue.

Using a recording setup as shown in FIG. 1*a* the pixels of the different sets of lines may be recorded interlaced e.g. in the following order: 304 307 310 305 308 311 306 309 312. In conventional image scanners, full colour pixel are formed by combining the pixels from the three sets of lines such that a first full colour pixel may be formed by combining pixel 304 307 310 in a first full colour pixel 313 having a colour distribution as shown in FIG. 3*c*, a second full colour pixel may be formed by combining pixel 305 308 311, and a third full colour pixel may be formed by combining pixel 306 309 312. Ideally, the full colour pixel 313 should have a colour corresponding to the average colour in the area from where it is recorded e.g. the full colour pixel 313 should have a relative colour distribution corresponding to average colour distribution in the area from where it is recorded. By looking at the area 313 in FIG. 3*a* it can be seen that two colours are present black and white. The "correct" colour of the full colour pixel should therefore be gray as gray is a mix of black and white. Gray is characterized by having equal RGB values. Ideally, the full colour pixel 313 therefore should have equal RGB values. However, as can be seen in FIG. 3*c* the full colour pixel comprises a strong red component, a medium green component and a low blue component. This is a result of the small spatial displacement between the areas from where the colour values are recorded. As can be seen from FIG. 3*b* the red component is recorded from an area having a white colour. The white colour reflects all coloured light highly, thereby resulting in the strong red component 304 shown in FIG. 3*c*. The green component 307 shown in FIG. 3*c* is recorded from an area having both a black colour and a white colour. Since the black colour absorbs all coloured light, the total resulting green component 307 shown in FIG. 3 is lower than the red component 304. The blue component 310 shown in FIG. 3*c* is recorded from an area having mainly a black colour. Again, since the black colour absorbs all coloured light, the total resulting blue component 310 shown in FIG. 3 is lower than both the red component 304 and the green component 310.

The result of the artefact is that colours not present on the scanned physical object are introduced in the scanned image. In this example the first full colour pixel will get an orange colour instead of the correct gray colour. The same effect occurs in the third full colour pixel 315 shown in FIG. 3*c* where an erroneous blue colour is introduced instead of the correct gray colour. Only the second full colour pixel 314 will get the correct colour since all the pixels from the first, the second and the third set of lines 305 308 311 making up the second full colour pixel 314 are recorded from an area having the same colour. The artefact may be known as colour fringing.

Applying filters to the individual colour channels of the scanned images has proven to be an ineffective way of removing the above described colour artefacts as such filters are less effective at changing the relative distribution between the different colours. However, by processing at least two of the first set of lines, the second set of lines and the third set of lines to create a first combined set of lines, a plurality of pixels may be formed where the value of the pixels may reflect a specific colour distribution. A filter applied to the combined set of lines can therefore more effectively change the relative colour distribution, thus more effectively remove the above described colour artefacts.

FIG. 3*d* shows how three pixels from three lines in a first combined set of lines may be formed according to an embodiment of the present invention. The pixels are formed by subtracting the second set of lines from the first set of lines e.g. the green colour information from the red colour information. The first pixel 320 in the combined set of lines is formed by subtracting the value of pixel 307 from the value of pixel 304, the second pixel 321 is formed by subtracting the value of pixel 308 from the value of pixel 305, and the third pixel 322 is created by subtracting value of pixel 309 from the value of pixel 306. Thus pixel values that represent the colour balance between the red and the green colour are created. As the above described colour artefacts may be characterized by fast changes in the relative distribution of the recorded colours e.g. as can be seen in FIG. 3*c*, this will correspondingly result in rapid changes in the values of the pixels in the combined set of lines as can be seen in FIG. 3*d*, thus by applying a filter that limits the speed of such changes e.g. a low-pass filter, a specific rule based filter, or a median filter colour artefacts may be removed. After the filtration the filtered combined set of lines may optionally be transformed back into the original colour channels e.g. red and green.

FIG. 4*a* shows an image sensor according to embodiments of the present invention. The image sensor 401 402 403 is in this example associated with one or more lense(s) 404 enabling the image sensor to have a wider field of view of the scanning plate 405. This setup is common with CCD image sensors and may be known as a CCD camera setup. The image sensor may comprise three or more linear arrays as shown in FIG. 1b e.g. a linear array for recording red light, a linear array for recording green light, and a linear array for recording blue light. Optionally the image sensor 401 402 403 may also comprise a fourth linear array configured to record black and white images. Due to misalignment between the sets of lines recorded by the three linear arrays of the image sensor 401 402 403 similar colour artefacts may result as described in relation to FIG. 3a-c.

Figure 4B:
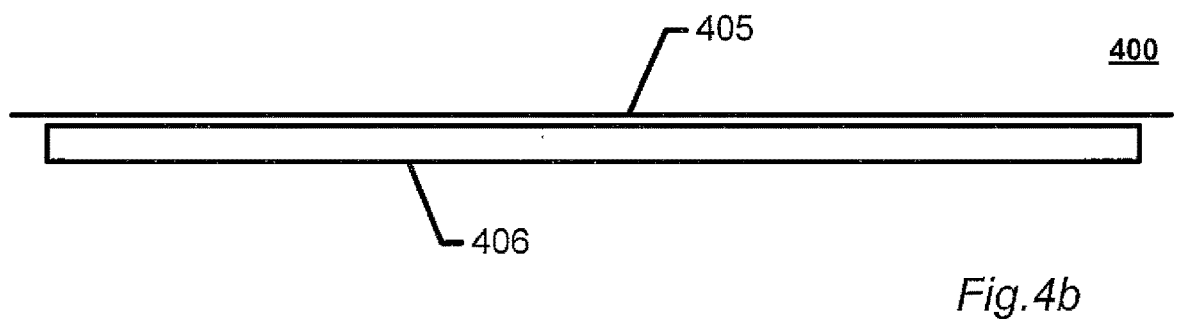

FIG. 4b shows an image sensor according to an embodiment of the present invention. The image sensor 406 is a contact image sensor (CIS) being in contact or proximity of the scan plate 405, where the physical object to be scanned is placed. The image sensor 406 may have a light source associated, the light sources being configured to generate light with different colours as described in relation to FIG. 1a.

Figure 5:
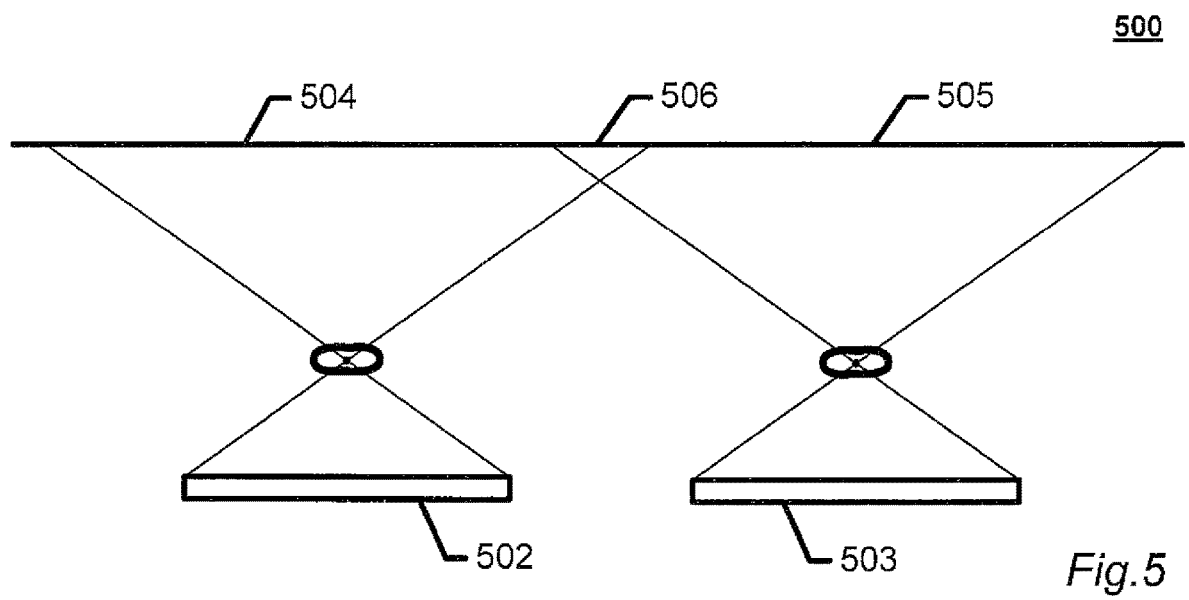
FIG. 5 show a schematic drawing of a recording setup used in a large format scanner comprising two image sensors according to an embodiment of the present invention.

FIG. 5 show a side view of a recording setup used in a large format scanner comprising a first image sensor 502 and a second image sensor 503 according to an embodiment of the present invention. Each image sensor 502 503 has a lens associated as described in relation to FIG. 4a. The first image sensor 502 is configured to record lines from a first part of the physical object 504 and the second image sensor 503 is configured to record lines from a second part 505 of a physical object. The first part and the second part 504 505 comprises a common part 506. By combining the recorded images from the two image sensors 502 503 large physical objects may be scanned.

Figure 6:
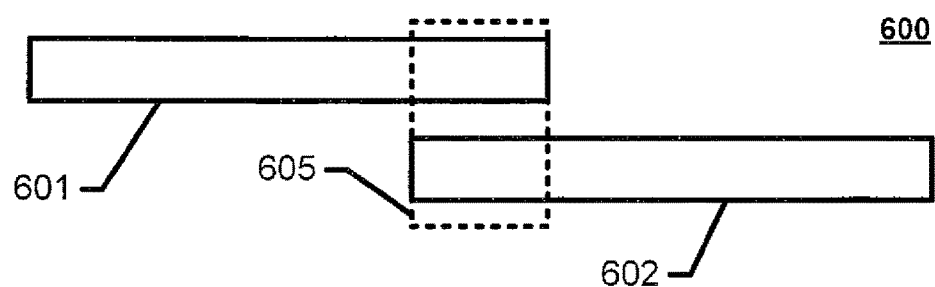
FIG. 6 show a schematic drawing of a recording setup used in a large format scanner comprising two image sensors according to an embodiment of the present invention.

FIG. 6 show a top view of a recording setup used in a large format scanner comprising a first image sensor 601 and a second image sensor 602 according to an embodiment of the present invention. The image sensors 601 602 are CIS image sensors as described in relation to FIG. 4b. The first image sensor 601 is configured to record lines from a first part of a physical object and the second image sensor 602 is configured to record lines from a second part of a physical object. The first image sensor 601 is positioned slightly in front of the second image sensor 602 so that the first part and the second part comprise a common part 605. By combining the recorded images from the two image sensors 601 602 large physical objects may be scanned.

Figure 7A:
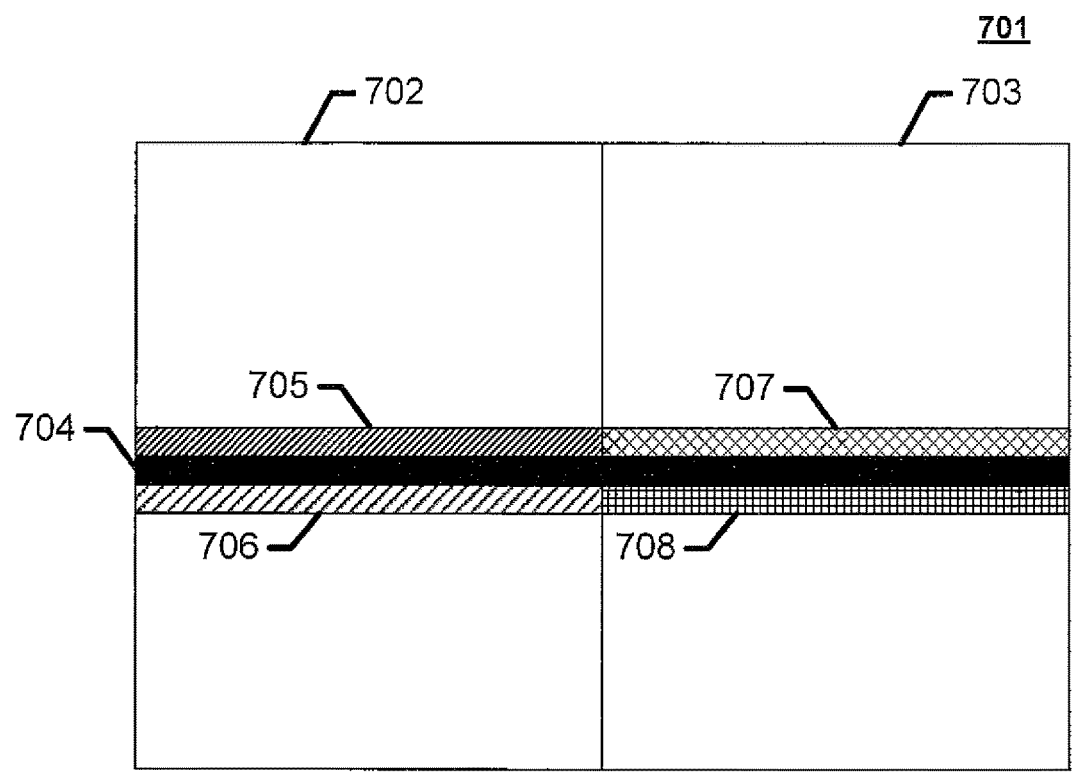
FIG. 7a-b illustrate a problem associated with large format scanners.

FIG. 7a illustrates a problem associated with large format scanners. Shown is a scanned image comprising a first part 702 recorded by a first image sensor and a second part 703 recorded by a second image sensor. The first image sensor and the second image sensor may be arranged as shown in FIG. 5 or FIG. 6. The image 701 is an image of a physical object having a sharp black line surrounded by two white areas. This situation corresponds to the situation presented in FIGS. 3a-c and as a result image artefacts 705 707 706 708 are present in the image. The image artefacts can be seen as the introduction of erroneous colours in the image 701. However, due to differences between the image sensors and/or alignment errors between the image sensors the artefacts will further differ for the different image sensors e.g. the artefact 705 is different from the artefact 707 and the artefact 706 is different from the artefact 708. As a result the artefacts will lower the homogeneity of the image 701 lowering the overall image quality.

Figure 7B:
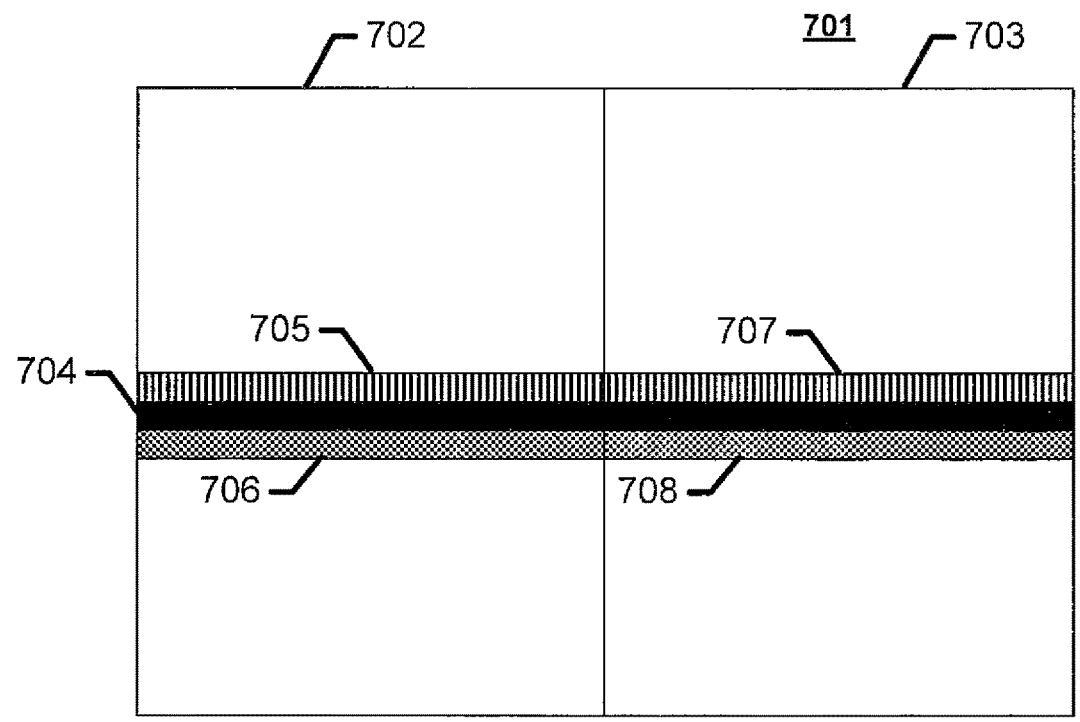

FIG. 7b shows the same image 701 as shown in FIG. 7a after a method of processing data from an image scanner for reducing image artefacts according to an embodiment of the present invention has been used. The resulting image is more homogeneous and it is harder for a viewer to tell that more than one image sensor has been used, thus the overall image quality is raised.

Figure 8:
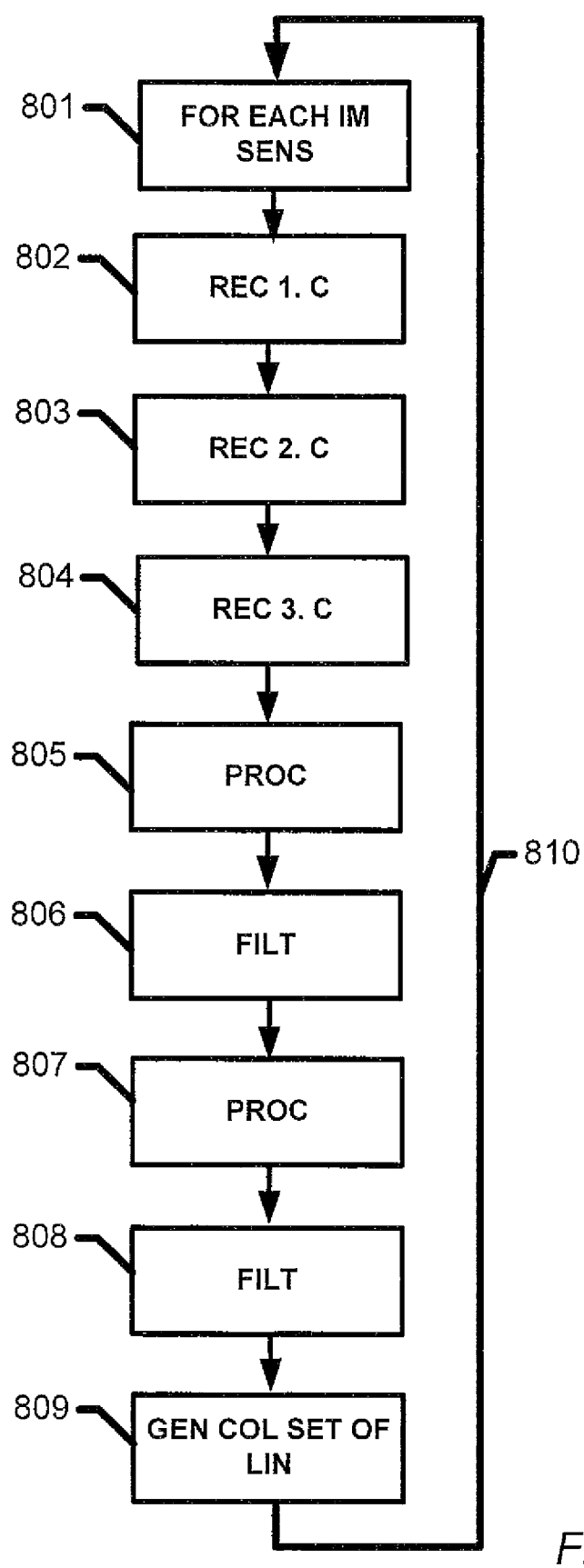
FIG. 8 shows a flow chart of a method of processing data from an image scanner for removing image artefacts according to an embodiment of the present invention.

FIG. 8 shows a flow chart of a method of processing data from an image scanner for removing image artefacts according to an embodiment of the present invention. In step 801, a first image sensor is selected. In step 802, using the first image sensor a first set of lines is recorded comprising a plurality of pixels representing recorded intensities of a first colour recorded from a first part the physical object. In step 803, using the first image sensor a second set of lines is recorded comprising a plurality of pixels representing recorded intensities of a second colour recorded from the first part the physical object. In step 804, using the first image sensor a third set of lines is recorded comprising a plurality of pixels representing recorded intensities of a third colour recorded from the first part the physical object.

In step 805, a first combined set of lines is created by processing the first set of lines and the third set of lines together. The processing may be achieved using any algorithm. The processing may comprise a per pixel division of the first set of lines with the third set of lines and/or a per pixel subtraction of the first set of lines from the third set of lines. In step 806, the first combined set of lines is filtered to remove image artefacts creating a first filtered combined set of lines. Next, in step 807 a second combined set of lines is created by processing the second and the third set of lines. The processing may comprise at least a per pixel division of the second set of lines with the third set of lines and/or a per pixel subtraction of the second set of lines from the third set of lines. In step 808, the second combined set of lines is filtered to remove image artefacts. Finally in step 809, the filtered first set of lines, the filtered second set of lines and the third set of lines are processed to generate a filtered colour set of lines comprising a plurality of pixels, wherein each pixel in the filtered colour set of lines comprises three colour values a first colour value obtained from the filtered first set of lines representing the intensity of the first colour, a second colour value obtained from the filtered second set of lines representing the intensity of the second colour, and a third colour value obtained from the third set of lines representing the intensity of the third colour, thus a filtered full colour scanned image of the first part of the physical object may be created.

The first colour values of the filtered colour set of lines may be created by per pixel subtracting the first filtered combined set of lines from the third set of lines, if the first combined set of lines is created by a per pixel subtraction of the first set of lines from the third set of lines. The second colour values of the filtered colour set of lines may be created by per pixel subtracting the second filtered combined set of lines from the third set of lines, if the second combined first set of lines is created by a per pixel subtraction of the second set of lines from the third set of lines. The third colour values of the filtered colour set of lines may simply correspond to the third set of lines. Thus by transforming the recorded colours into another colour space, filtering the data in that colour space, and transforming the data back into the original colour space a simple and effective method of removing image artefacts is provided. All the above steps may be repeated for a plurality of image sensors 810. It should be understood that some or all of the above described steps does not need to run sequentially, and will often in practice run in parallel e.g. the different sets of lines may be recorded in parallel or interlaced, additionally steps 805-809 may be combined into a single step.

Figure 9:
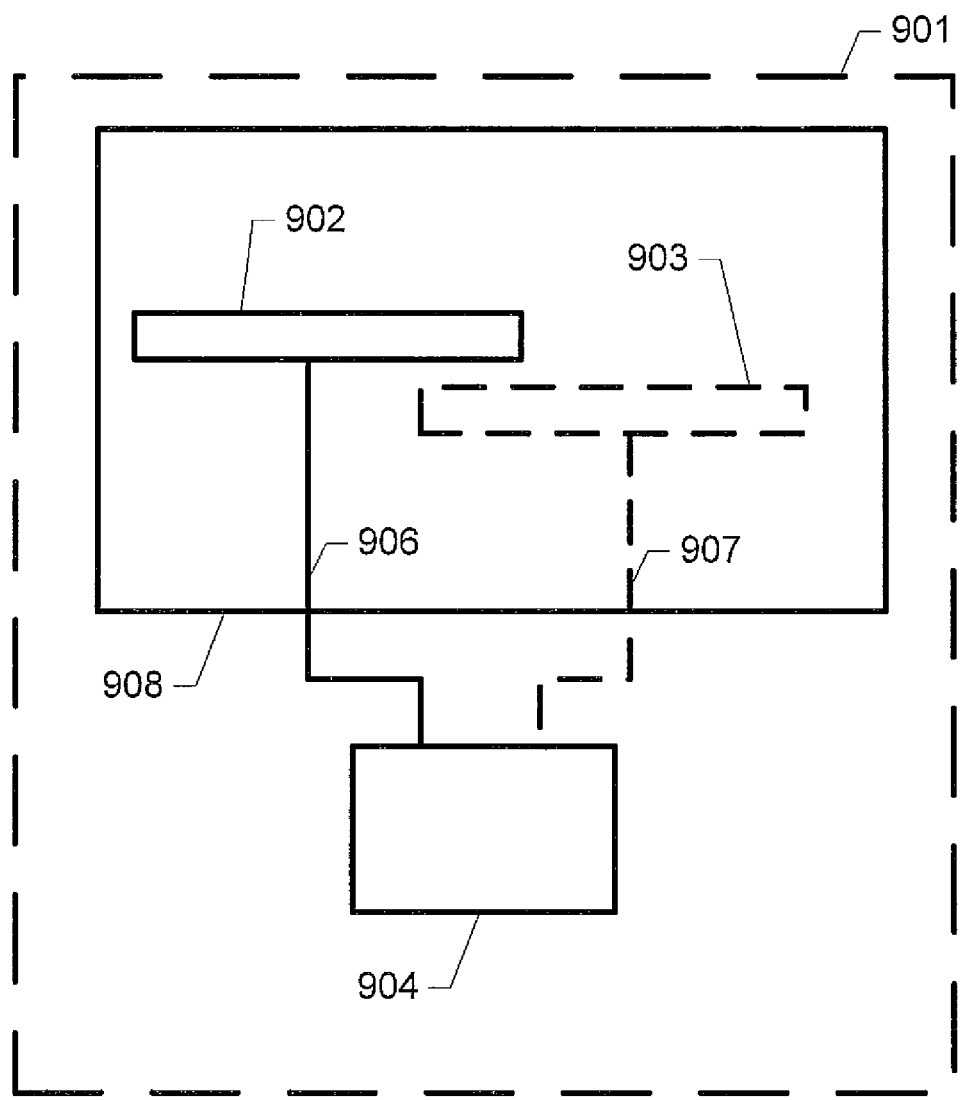
FIG. 9 shows a schematic drawing of an apparatus for scanning according to an embodiment of the present invention.

FIG. 9 shows a schematic drawing of an apparatus for scanning 901, according to an embodiment of the present invention. The apparatus comprises a first image sensor 902 and a processing unit 904 connected to the image sensors by data communication means 906. The apparatus may further optionally comprise a second image sensor 903. The processing unit 904 may process the signals received from the image sensor 902 using the principles discussed above to remove image artefacts. All components of the apparatus 701 may be integrated in a single integral unit, e.g. in an optical scanner, or the different parts of the apparatus may be implemented in different components; e.g. the image sensor 902 may be implemented in a first component 908 and the processing unit may be implemented in a second component 904 e.g. in a personal computer (PC) connected to the first component 908 with data communication means 906 or in a server connected to the internet communicating directly or indirectly with the first component 908 using data communication means 906.

Figure 10:
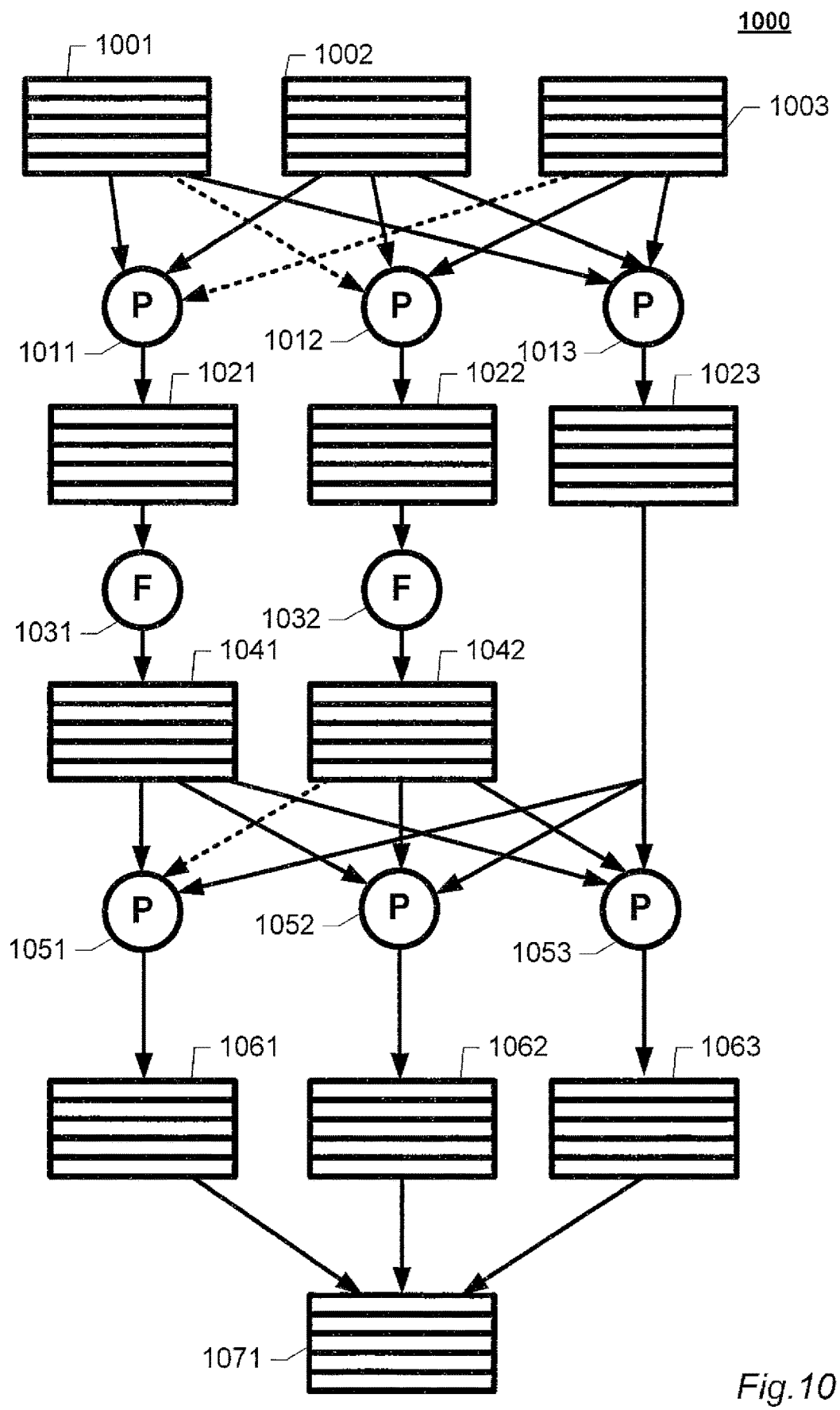
FIG. 10 shows a schematic drawing of a method of processing data from an image sensor for removing image artefacts according to an embodiment of the present invention.

FIG. 10 shows a schematic drawing of a method of processing data from an image sensor for removing image artefacts according to an embodiment of the present invention. A first set of lines 1001, a second set of lines 1002, and a third set of lines 1003 is recorded from a first part of a physical object. The first set of lines 1001 comprises a plurality of pixels representing recorded colour intensities of a first colour such as red, the second set of lines 1002 comprises a plurality of pixels representing recorded colour intensities of a second colour such as green, and the third set of lines 1003 comprises a plurality of pixels representing recorded colour intensities of a third colour such as blue. The first set of lines 1001, the second set of lines 1002, and optionally the third set of lines 1003 are processed together 1011 to create a first combined set of lines 1021. The processing may be done by for each pixel, subtracting the average of the second set of lines 1002 and the third set of lines 1003, from the first set of lines 1001 e.g. using the equation below:

$$comb1_{(x,y)} = \frac{(418 \cdot set1_{(x,y)} - 209 \cdot (set2_{(x,y)} + set3_{(x,y)}))}{512}$$

where $comb1_{(x,y)}$ is the pixel value in the first combined set of lines 1021 having index x,y, $set1_{(x,y)}$ is the pixel value in the first set of lines 1001 having index x,y, $set2_{(x,y)}$ is the pixel value in the second set of lines 1002 having index x,y and $set3_{(x,y)}$ is the pixel value in the third set of lines 1003 having index x,y.

The second set of lines 1002, the third set of lines 1003, and optionally the first set of lines 1001 are processed together 1012 to create a second combined set of lines 1022. The processing may be done by for each pixel, subtracting the third set of lines 1003 from the second set of lines 1002 e.g. using the equation below:

$$comb2_{(x,y)} = \frac{362 \cdot (set2_{(x,y)} - set3_{(x,y)})}{512}$$

where $comb2_{(x,y)}$ is the pixel value in the second combined set of lines 1022 having index x,y, $set2_{(x,y)}$ is the pixel value in the second set of lines 1002 having index x,y and $set3_{(x,y)}$ is the pixel value in the third set of lines 1003 having index x,y.

The first set of lines 1001 the second set of lines 1002, and the third set of lines 1003 are processed together 1013 to create a third combined set of lines 1023. The processing may be done by for each pixel, adding the first set of lines 1001, the second set of lines 1002 and the third set of lines 1003 e.g. using the equation below:

$$comb3_{(x,y)} = \frac{296 \cdot (set1_{(x,y)} + set2_{(x,y)} + set3_{(x,y)})}{512}$$

where $comb3_{(x,y)}$ is the pixel value in the third combined set of lines 1023 having index x,y, $set1_{(x,y)}$ is the pixel value in the first set of lines 1001 having index x,y, $set2_{(x,y)}$ is the pixel value in the second set of lines 1002 having index x,y and $set3_{(x,y)}$ is the pixel value in the third set of lines 1003 having index x,y.

The first combined set of lines 1021, the second combine set of lines 1022, and the third combined set of lines 1023 may comprise all information present in the first set of lines, the second set of lines and the third set of lines 1001 1002 1003. The first combined set of lines 1021 and the second combined set of lines 1022 may represent the colour balance. The third combined set of lines 1023 may represent the light intensity.

The first combined set of lines 1021 is filtered 1031 to create a first filtered combined set of lines 1041, and the second combined set of lines 1022 is filtered 1032 to create a second filtered combined set of lines 1042. The filtering process may be performed by moving a filter kernel over the first combined set of lines 1021 and the second combined set of lines 1022. The filter may be a linear filter e.g. a low-pass filter and/or a non linear filter e.g. a median filter. The filter kernel may have an elongated shape. The filter kernel may have a shape so that pixels from at least 2, 3, 4, 5, 6, 8 or 10 lines are processed together to yield an output value of the filtering process. The filter kernel may have a shape so that no more than 1, 2, 3, 4 or 5 pixels from a line are processed together to yield an output value of the filtering process.

In some embodiments, the third combined set of lines is not filtered. That may be an advantage for removal of colour fringing image artefacts, as it is the erroneous relative distribution of the recorded colours that is the main source for the artefact and not the total light intensity of the recorded colours, which the third combined set of lines may represent.

The first filtered combined set of lines 1041, the third combined set of lines 1023 and optionally the second filtered combined set of lines 1042 are processed together 1051 to create a first filtered set of lines 1061. The processing may be done by for each pixel adding the first filtered combined set of lines 1041 weighted with a first factor, with the third combined set of lines 1023 weighted with a second factor e.g. using the equation below:

$$fset1_{(x,y)} = \frac{418 \cdot filt\_comb1_{(x,y)} + 296 \cdot comb3_{(x,y)}}{512}$$

where $fset1_{(x,y)}$ is the pixel value in the first filtered set of lines 1061 having index x,y, $filt\_comb1_{(x,y)}$ is the pixel value in the first filtered combined set of lines 1041 having index x,y, and $filt\_comb3_{(x,y)}$ is the pixel value in the third combined set of lines 1023 having index x,y.

The first filtered combined set of lines 1041, the second filtered combined set of lines 1042 and the third combined set of lines 1023 are processed together 1052 to create a second filtered set of lines 1062. The processing may be done by for each pixel, adding the second filtered combined set of lines 1042 weighted with a first factor, with the third combined set of lines 1023 weighted with a second factor and subtracting first filtered combined set of lines 1041 weighted with a third factor e.g. using the equation below:

$$fset2_{(x,y)} = \frac{362 \cdot \text{filt\_comb2}_{(x,y)} + 296 \cdot comb3_{(x,y)} - 209 \cdot \text{filt\_comb1}_{(x,y)}}{512}$$

where $fset2_{(x,y)}$ is the pixel value in the second filtered set of lines 1062 having index x,y, $\text{filt\_comb1}_{(x,y)}$ is the pixel value in the first filtered combined set of lines 1041 having index x,y, $\text{filt\_comb2}_{(x,y)}$ is the pixel value in the second filtered combined set of lines 1042 having index x,y, and $comb3_{(x,y)}$ is the pixel value in the third combined set of lines 1023 having index x,y.

The first filtered combined set of lines 1041, the second filtered combined set of lines 1042 and the third combined set of lines 1023 are processed together 1052 to create a third filtered set of lines 1063. The processing may be done by for each pixel, subtracting the first filtered combined set of lines 1041 weighted with a first factor and the second filtered combined set of lines 1042 weighted with a second factor from the third combined set of lines 1023 weighted with a third factor e.g. using the equation below:

$$fset3_{(x,y)} = \frac{296 \cdot comb3_{(x,y)} - 209 \cdot \text{filt\_comb1}_{(x,y)} - 362 \cdot \text{filt\_comb2}_{(x,y)}}{512}$$

where $fset3_{(x,y)}$ is the pixel value in the third filtered set of lines 1063 having index x,y, $\text{filt\_comb1}_{(x,y)}$ is the pixel value in the first filtered combined set of lines 1041 having index x,y, $\text{filt\_comb2}_{(x,y)}$ is the pixel value in the second filtered combined set of lines 1042 having index x,y, and $comb3_{(x,y)}$ is the pixel value in the third combined set of lines 1023 having index x,y.

The first filtered set of lines 1061 comprises a plurality of pixels representing filtered recorded intensities of the first colour from the first part of the physical object, the second filtered set of lines 1062 comprises a plurality of pixels representing filtered recorded intensities of the second colour from the first part of the physical object, and the third filtered set of lines 1063 comprises a plurality of pixels representing filtered recorded intensities of the third colour from the first part of the physical object. Finally, the first filtered set of lines, the second filtered set of lines and third filtered set of lines 1061 1062 1063 are merged into a filtered colour set of lines 1071. The filtered colour set of lines comprises a plurality of pixels each pixel comprises three colour values one obtained from the first filtered set of lines 1061, one obtained from the second filtered set of lines 1062, and one obtained from the third filtered set of lines 1063. Thus a filtered full colour image is created with reduced image artefacts.

Figure 11:
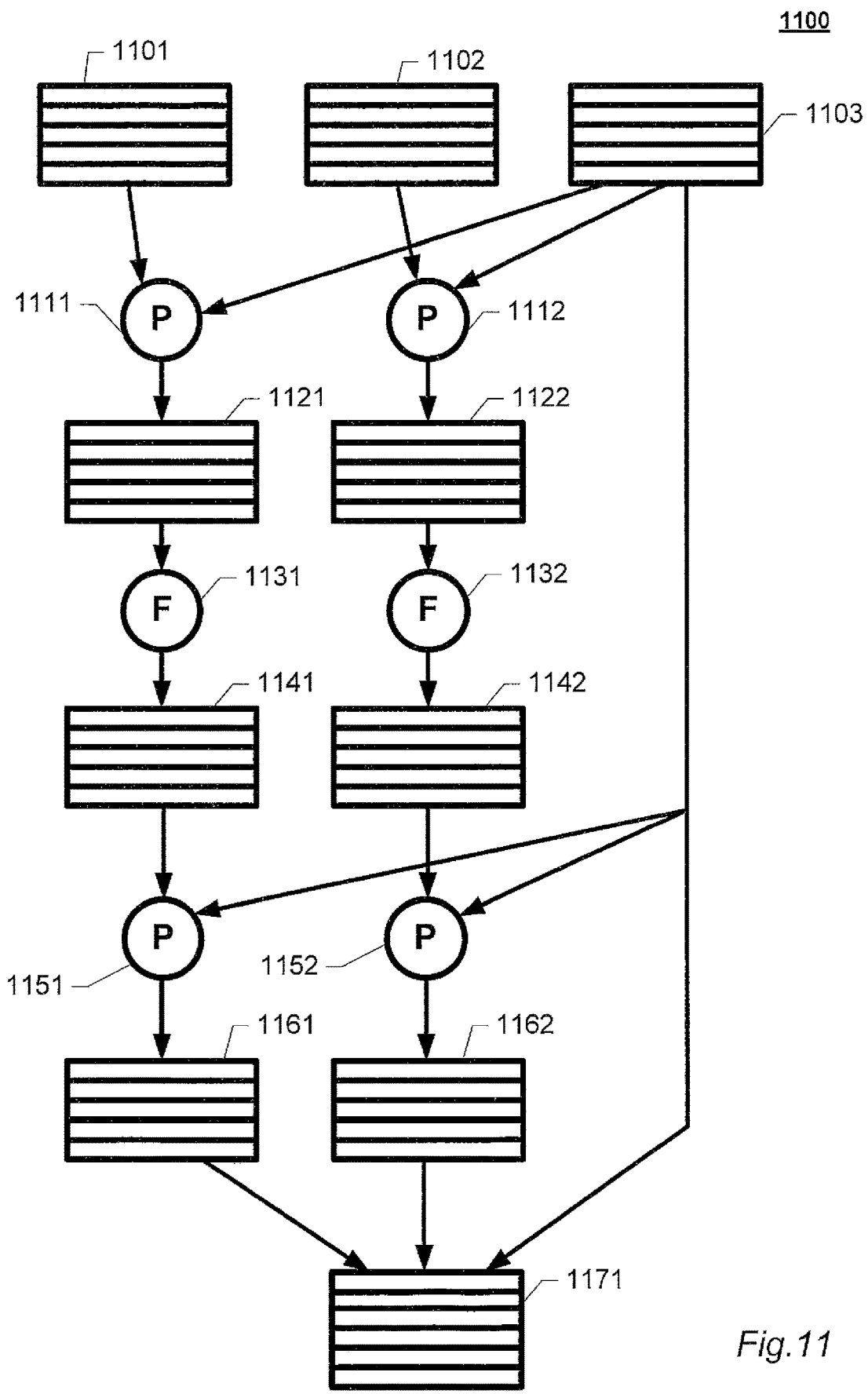
FIG. 11 shows a schematic drawing of a method of processing data from an image sensor for removing image artefacts according to an embodiment of the present invention.

FIG. 11 shows a schematic drawing of a method of processing data from an image sensor for removing image artefacts, according to an embodiment of the present invention. A first set of lines 1101, a second set of lines 1102, and a third set of lines 1103 is recorded from a first part of a physical object by an image sensor. The first set of lines 1101 comprises a plurality of pixels representing recorded colour intensities of a first colour such as red, the second set of lines 1102 comprises a plurality of pixels representing recorded colour intensities of a second colour such as green, and the third set of lines 1103 comprises a plurality of pixels representing recorded colour intensities of a third colour such as blue. The first set of lines 1101 and the third set of lines 1103 are processed together 1111 to create a first combined set of lines 1121. The processing 1111 may be done by, for each pixel subtracting the first set of lines 1101 from the third set of lines 1103 e.g. using the below equation:

$$\text{Comb1}_{(x,y)} = set3_{(x,y)} - set1_{(x,y)}$$

Where $\text{Comb1}_{(x,y)}$ is the pixel value in the first combined set of lines 1121 having index x,y, $set3_{(x,y)}$ is the pixel value in the third set of lines 1103 having index x,y, and $set1_{(x,y)}$ is the pixel value in the first set of lines 1101 having index x,y.

Correspondingly, the second set of lines 1102 and the third set of lines 1103 are processed together 1112 to create a second combined set of lines 1122. The processing 1112 may be done by, for each pixel subtracting the second set of lines 1102 from the third set of lines e.g. using the below equation:

$$\text{Comb2}_{(x,y)} = set3_{(x,y)} - set2_{(x,y)}$$

Where $\text{Comb2}_{(x,y)}$ is the pixel value in the second combined set of lines 1122 having index x,y, $set3_{(x,y)}$ is the pixel value in the third set of lines 1103 having index x,y, and $set1_{(x,y)}$ is the pixel value in the first set of lines 1101 having index x,y.

The first combined set of lines 1121, the second combine set of lines 1122, and the third set of lines 1103 may comprise all information present in the first set of lines the second set of lines and the third set of lines 1101 1102 1103. The first combined set of lines 1121 may represent the colour balance between the first colour and the third colour in the first part of the physical object and the second combined set of lines 1122 may represent the colour balance between the second and the third colour in the first part of the physical object.

Next, the first combined set of lines 1121 is filtered 1131 to create a first filtered combined set of lines 1141. The filtering process may be carried out by using a median filter e.g. using the below equation:

$$\text{filt\_comb1}_{(x,y)} = \text{median}(comb1_{(x,y-1)}, comb1_{(x,y)}, comb1_{(x,y+1)})$$

Where $\text{filt\_comb1}_{(x,y)}$ is pixel value of the first filtered combined set of lines 1141 having pixel index x,y, where y specify a particular line and x specify a particular pixel on said line, $comb1_{(x,y)}$ is the pixel value of the first combined set of lines 1121 having pixel index x,y, and median is a function that returns the median of its input. Thus in this example, median returns the median of the three values $comb1_{(x,y-1)}$, $comb1_{(x,y)}$, $comb1_{(x,y+1)}$.

Correspondingly, the second combined set of lines 1122 is filtered 1132 to create a second filtered combined set of lines 1142. The filtering process may be carried out using a median filter e.g. using the below equation:

$$\text{filt\_comb2}_{(x,y)} = \text{median}(comb2_{(x,y-1)}, comb2_{(x,y)}, comb2_{(x,y+1)})$$

Where $\text{filt\_comb2}_{(x,y)}$ is the pixel value of the second filtered combined set of lines 1142 having pixel index x,y, where y specify a particular line and x specify a particular pixel on said line, $comb2_{(x,y)}$ is the pixel value of the second combined set of lines 1122 having pixel index x,y, and median is a function that returns the median of its input.

Thus in this example, median returns the median of the three values $comb2_{(x,y-1)}$, $comb2_{(x,y)}$, $comb2_{(x,y+1)}$.

Then, the first filtered combined set of lines 1141, the second filtered combined set of lines 1142, and the third set of lines 1103 are processed together 1151 to create a first filtered set of lines 1161 and a second filtered set of lines 1162. The first filtered set of lines 1161 may be created by for each pixel subtracting the first filtered combined set of lines 1141 from the third set of lines 1103 e.g. using the below equation:

$$fset1_{(x,y)} = set3_{(x,y)} - filt\_comb1_{(x,y)}$$

Where $fset1_{(x,y)}$ is the pixel value of the first filtered set of lines 1161 having pixel index x,y, $set3_{(x,y)}$ is the pixel value of the third set of lines 1103 having pixel index x,y, and $filt\_comb1_{(x,y)}$ is the pixel value of the first filtered combined set of lines 1161 having pixel index x,y.

Correspondingly, the second filtered set of lines 1162 may be created by for each pixel subtracting the second filtered combined set of lines 1142 from the third set of lines 1103 e.g. using the below equation:

$$fset2_{(x,y)} = set3_{(x,y)} - filt\_comb2_{(x,y)}$$

Where $fset2_{(x,y)}$ is the pixel value of the second filtered set of lines 1162 having pixel index x,y, $set3_{(x,y)}$ is the pixel value of the third set of lines 1103 having pixel index x,y, and $filt\_comb2_{(x,y)}$ is the pixel value of the second filtered combined set of lines 1162 having pixel index x,y.

Finally, the first filtered set of lines, the second filtered set of lines and third set of lines 1261 1262 1103 are merged into a filtered colour set of lines 1171. The filtered colour set of lines comprises a plurality of pixels each pixels comprises three colour values one obtained from the first filtered set of lines 1161, one obtained from the second filtered set of lines 1162, and one obtained from the third set of lines 1103. Thus a filtered full colour image is created with reduced image artefacts. By directly using the values from the third set of lines 1103 to create the filtered colour set of lines 1171, fewer computations are needed.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components, but does not preclude the presence or addition of one or more other features, integers, steps, components or groups thereof.

The invention claimed is:

1. A method of processing data from an image scanner for reducing image artefacts, comprising at the image scanner comprising a first image sensor arranged to scan a physical object by relative movement between the physical object and the image sensor:

recording a first set of lines from a first part of a physical object, the first set of lines comprising a plurality of pixels representing recorded intensities of a first colour;

recording a second set of lines from the first part of the physical object, the second set of lines comprising a plurality of pixels representing recorded intensities of a second colour; and recording a third set of lines from the first part of the physical object, the third set of lines comprising a plurality of pixels representing recorded intensities of a third colour, and at a processing unit:

processing at least two of the first set of lines, the second set of lines or the third set of lines to create a first combined set of lines including a plurality of pixels each pixel having a value that is determined on the basis of at least two of the first set of lines, the second set of lines or the third set of lines;

processing at least two of the first set of lines, the second set of lines or the third set of lines to create a second combined set of lines including a plurality of pixels each pixel having a value that is determined on the basis of at least two of the first set of lines, the second set of lines or the third set of lines;

processing at least two of the first set of lines, the second set of lines or the third set of lines to create a third combined set of lines including a plurality of pixels each pixel having a value that is determined on the basis of at least two of the first set of lines, the second set of lines or the third set of lines;

wherein the first combined set of lines and the second combined set of lines represent color balance; and wherein the third combined set of lines represents total light intensity of recorded colors; and filtering said first combined set of lines to filter out image artefacts creating a first filtered combined set of lines, wherein filtering comprises filtering out high frequency content of the first combined set of lines; and filtering said second combined set of lines to filter out image artefacts creating a second filtered combined set of lines, wherein filtering comprises filtering out high frequency content of the first combined set of lines.

2. A method of processing signals according to claim 1, wherein the spatial locations on the physical object where the first set of lines are recorded at least partly overlap with the spatial location on the physical object where the second set of lines are recorded.

3. A method of processing signals according to claim 1, wherein the spatial location on the physical object where the second set of lines are recorded at least partly overlap with the spatial location on the physical object where the third set of lines are recorded.

4. A method of processing data according to claim 1, wherein a value of a particular pixel in the first combined set of lines is determined by processing a value obtained from a particular pixel in each of two selected set of lines of the first set of lines, the second set of lines or the third set of lines.

5. A method of processing data according to claim 4, wherein the two values of a particular pixel in the two selected set of lines is processed to create the value of the particular pixel in the first combined set of lines so that the value of the particular pixel in the first combined set of lines is dependent on the difference between the values of the particular pixel in the select two set of lines.

6. A method of processing data according to claim 5, wherein the two values of a particular pixel in the two selected set of lines is processed to create the value of the particular pixel in the first combined set of lines so that an increase in the difference between the values of the particular pixel in the select two set of lines always will result in an increase in the absolute value of the particular pixel in the first combines set of lines.

7. A method of processing signals according to claim 1, wherein the first set of lines, the second set of lines and the third set of lines are merged into a colour set of lines comprising a plurality of pixels, wherein each pixel in the colour set of lines comprises three colour values specifying recorded colour intensity values and wherein the step of creating a combined set of lines comprises for each pixel in the colour set of lines processing at least two of the three colour values together to form a pixel value in the combined set of lines so that each pixel in the combined set of lines is determined on the basis of at least two colour values of a pixel of the colour set of lines.

8. A method of processing signals according to claim 1, wherein the image sensor is a contact image sensor (CIS).

9. A method of processing signals according to claim 1, wherein the image sensor is a charge-coupled device (CCD).

10. A method of processing signals according to claim 1, wherein the step of filtering said first combined set of lines further comprises processing pixels of said first combined set of lines created from data recorded at different points in time.

11. A method of processing signals according to claim 1, wherein the step of filtering said first combined set of lines comprises median filtering the first combined set of lines.

12. A method of processing data according to claim 1, wherein, the method additionally comprises the step of:
processing at least two of the first set of lines, the second set of lines or the third set of lines to create a second combined set of lines comprising a plurality of pixels each pixel having a value that is determined on the basis of at least two of the first set of lines, the second set of lines or the third set of lines; and
filtering said second combined set of lines to filter out image artefacts creating a second filtered combined set of lines.

13. A method of processing data according to claim 12, wherein said first combined set of lines and said second combined set of lines are filtered independently so that the first filtered combined set of lines is not directly influenced by the second combined set of lines, and the second filtered combined set of lines is not directly influenced by the first filtered combined set of lines.

14. A method of processing data according to claim 1, wherein the first combined set of lines represents the colour balance between the first colour and the second colour in the first part of the physical object.

15. A method of processing data according to claim 1, wherein the second combined set of lines represents the colour balance between the second colour and the third colour in the first part of the physical object.

16. A method of processing data according to claim 1, wherein each of the first set of lines, the second set of lines and the third set of lines are processed to create the first combined set of lines, wherein the first combine set of lines comprises a plurality of pixels, each pixel having a value that is determined on the basis of the first set of lines, the second set of lines and the third set of lines.

17. A method of processing data according to claim 1, wherein the method further comprises processing at least two of the first set of lines, the second set of lines or the third set of lines to create a third combined set of lines comprising a plurality of pixels each pixel having a value that is determined on the basis of at least two of the first set of lines, the second set of lines or the third set of lines.

18. A method of processing data according to claim 1, wherein the first filtered combined set of lines is processed together with specific additional data to generate a first filtered set of lines comprising a plurality of pixels each pixel having a value that represents an intensity of the first colour.

19. A method of processing data according to claim 1, wherein the first filtered combined set of lines is processed together with specific additional data to generate a second filtered set of lines comprising a plurality of pixels each pixel having a value that represents an intensity of the second colour.

20. A method of processing data according to claim 1, wherein the first filtered combined set of lines and the second filtered combined set of lines is processed together with specific additional data to generate a first filtered set of lines comprising a plurality of pixels each pixel having a value that represents an intensity of the first colour, a second filtered set of lines comprising a plurality of pixels each pixel having a value that represents an intensity of the second colour, and a third filtered set of lines comprising a plurality of pixels each pixel having a value that represents an intensity of the third colour.

21. A method of processing data according to claim 1, wherein the second filtered combined set of lines is processed together with specific additional data to generate a second filtered set of lines comprising a plurality of pixels each pixel having a value that represents an intensity of the second colour.

22. A method of processing data according to claim 1, wherein the first combined set of lines is created by processing the first set of lines and the third set of lines, the second combined set of lines is created by processing the second and the third set of lines, and wherein the first filtered combined set of lines is processed together with the third set of lines to generate a first filtered set of lines, the first filtered set of lines comprising a plurality of pixels each pixel having a value that represents an intensity of the first colour, and the second filtered combined set of lines is processed together with the third set of lines to generate a second filtered set of lines, the second filtered set of lines comprising a plurality of pixels each pixel having a value that represents an intensity of the second colour.

23. A method of processing data according to claim 22, wherein the first filtered set of lines, the second filtered set of lines and the third set of lines are processed to generate a filtered colour set of lines comprising a plurality of pixels, wherein each pixel in the filtered colour set of lines comprises three colour values one obtained from the first filtered set of lines, one obtained from the second filtered set of lines, and one obtained from the third set of lines.

24. A method of processing data according to claim 1, wherein the image scanner further comprises a second image sensor arranged to:
record a fourth set of lines from a second part of the physical object, the fourth set of lines comprising a plurality of pixels representing recorded intensities of the first colour;
record a fifth set of lines from the second part of the physical object, the fifth set of lines comprising a plurality of pixels representing recorded intensities of the second colour; and
record a sixth set of lines from the second part of the physical object, the sixth set of lines comprising a plurality of pixels representing recorded intensities of the third colour, wherein the method comprises the steps of:

processing at least two of the fourth set of lines, the fifth set of lines or the sixth set of lines to create a fourth combined set of lines comprising a plurality of pixels each pixel having a value that is determined on the basis of at least two of the fourth set of lines, the fifth set of lines or the sixth set of lines; and filtering said fourth combined set of lines to filter out image artefacts creating a fourth filtered combined set of lines.

25. A computer program product comprising program code means adapted to cause a data processing system to perform the steps of the method according to claim 1, when said program code means are executed on the data processing system and are on a non-transitory computer-readable medium.

* * * * *